Dec. 30, 1969     J. C. BUSOT     3,487,049
PROCESS FOR PRODUCING POLYETHYLENE TEREPHTHALATE
Filed Jan. 4, 1967
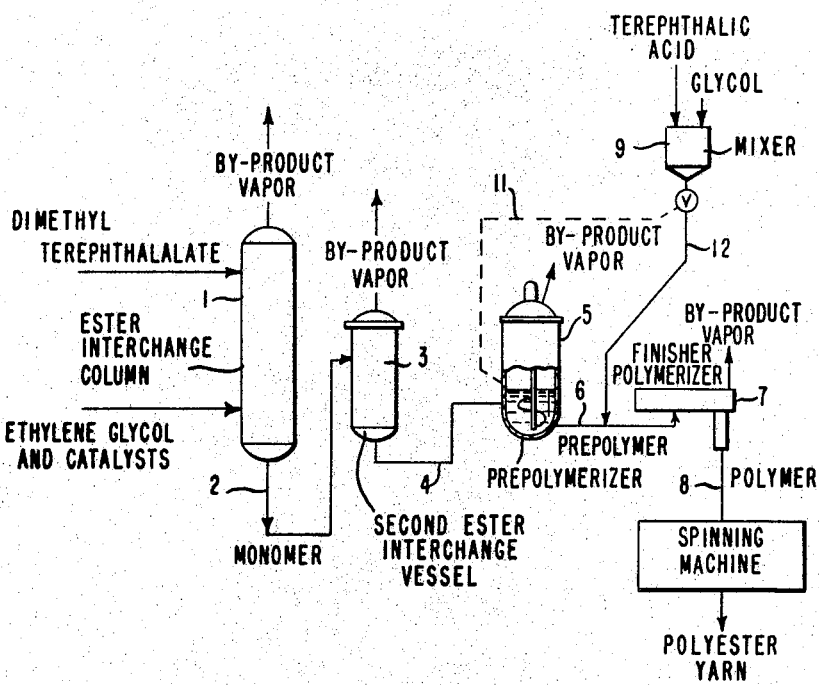
INVENTOR
JESUS C. BUSOT
BY *Norris E. Ruckman*
ATTORNEY United States Patent Office 3,487,049
Patented Dec. 30, 1969

1

3,487,049
PROCESS FOR PRODUCING POLYETHYLENE TEREPHTHALATE
Jesus C. Busot, Kinston, N.C., assignor to E. I. du Pont de Nemours and Company, Wilmington, Del., a corporation of Delaware
Filed Jan. 4, 1967, Ser. No. 607,270
Int. Cl. C08g *17/04, 17/08, 17/14*
U.S. Cl. 260—75     3 Claims

ABSTRACT OF THE DISCLOSURE

A continuous process for producing fiber-forming linear polyester from dimethyl terephthalate and ethylene glycol is described and illustrated. Ester interchange to produce monomer and polymerization of the monomer are carried out continuously in a series of reaction vessels. The addition of a small amount of finely divided terephthalic acid at an intermediate point is shown to increase the degree of polymerization and improve the color under the same conditions, or to increase the rate at which fiber-forming molecular weight is obtained, in comparison with operation of the process without addition of the terephthalic acid.

---

This invention relates to polymerization processes and, more particularly, to improvements in the continuous production of fiber-forming linear terephthalate polyesters.

Terephthalate polyesters such as those disclosed in Whinfield et al. U.S. Patent No. 2,465,319 have become valuable articles of commerce and are produced in large quantities for use in the form of fibers and films. One manufacturing process starts with the dimethyl ester of terephthalic acid, first carrying out an ester-exchange reaction with glycol at atmospheric pressure to produce the bis-glycol terephthalate, and then heating the bis-glycol terephthalate under reduced pressure to split out excess glycol and form the highly polymeric terephthalate polyester. The reactions are usually carried out continuously in several successive stages in a series of interconnected vessels. The vessels usually include an "exchanger" in which the initial exchange reaction is carried out, a "prepolymerizer" in which low molecular weight polymer is formed at an intermediate temperature and pressure, and a "finisher" where the final stages of polymerization are carried out at high temperature and low pressure. The presence of one or more catalysts is required to provide reaction rates high enough for commercial operation.

An increase in polymerization rate is highly desirable as it allows the use of smaller vessels for a given rate of polymer production, thereby decreasing the amount of capital investment required. Alternatively, an increase in polymerization rate may allow the use of higher pressures in the finisher, and thereby reduce the requirements of the vacuum producing system, or may allow the use of lower temperatures in the finisher with a consequent reduction in side reactions and color formation. Attempts to increase the polymerization rate by raising the catalyst concentration have not been entirely successful. For example, increasing the concentration of antimony oxide, a preferred polymerization catalyst, does not produce a corresponding increase in reaction rate. Futhermore, higher concentrations of antimony oxide result in a "graying" of the polymer, presumably from the formulation of metallic antimony in finely divided form.

The present invention is concerned with the discovery of a method of increasing the degree of polymerization in the preparation of polyesters and at the same time providing polymer with improved color. The invention allows higher rates of throughput for equipment of a given size, or for the use of smaller equipment for a given throughput. Other conditions being equal, the invention allows for the production of a higher polymer viscosity or for the use of a lower temperature or for the use of a higher pressure in the finisher.

In accordance with the present invention, it has now been found that, in the production of glycol terephthalate polyesters by a polyesterification reaction carried out at elevated temperatures under reduced pressure, the degree of polymerization obtained is increased by injecting into the low molecular weight prepolymer, undergoing polymerization, a glycol slurry of finely divided terephthalic acid in amounts sufficient to provide from 0.01% to 4% by weight of terephthalic acid based upon the weight of polymer produced. Amounts of terephthalic acid smaller than about 0.01% by weight do not give an appreciable effect, while amounts greater than about 4% limit the degree of polymerization in conventional commercial procedures.

By the term "low molecular weight prepolymer" is meant a polymerizing mixture which has passed the monomeric stage but has not yet reached the desired final molecular weight. Preferably the glycol slurry of terephthalic acid is added to the prepolymer having an intrinsic viscosity in the range 0.1 to 0.5, which corresponds approximately to a 2 to 20 relative viscosity range.

This invention will be more fully understood by reference to the accompanying drawing which is a schematic illustration of a continuous polymerization system suitable for use in practicing the present invention.

Referring now to the drawing, dimethyl terephthalate, ethylene glycol, and catalyst are supplied to ester interchange column 1 where the exchange reaction is carried out and methanol removed from the top of the column as vapor. Liquid product comprising primarily bis-$\beta$-hydroxyethylterephthalate containing a small amount of low polymer and glycol is continuously removed from column 1 through transfer line 2 and injected into the second-stage vessel 3 which operates under moderately reduced pressure and elevated temperature to remove excess glycol. Liquid product from vessel 3 is transferred through conduit 4 to prepolymerizer 5 where the pressure is reduced further and the temperature raised sufficiently to give a low molecular weight product having an intrinsic viscosity of about 0.2–0.3. This "prepolymer" product is transferred continuously through transfer line 6 to the finish polymerizer vessel 7 where the polymerization is completed and the final product transferred to the spinning machine through conduit 8 for melt-spinning into yarn. When operated in accordance with the present invention, terephthalic acid powder and glycol are supplied to mixer 9 for the preparation of a slurry. This slurry is then metered by means of valve 10 either through conduit 11 to prepolymerizer vessel 5 or through conduit 12 to prepolymer transfer line 6, the latter being preferred.

It has been found that best results are obtained if the amount of trephthalic acid added to the polymerization system is adjusted to suit the degree of polymerization of the prepolymer at the point of addition. Preferably the amount of added terephthalic acid falls below an upper limit defined by $$Z_1 = e^{(1.93 - 0.151 RV)}$$

and above a lower limit defined by $$Z_2 = e^{-(0.380 + 0.151 RV)}$$

where Z is the weight percent, based on polymer, of terephthalic acid added and RV is the relative viscosity of the low molecular weight prepolymer to which the terephthalic acid is added.

The concentration of the glycol slurry used in the invention may vary over a wide range, but it will be recognized that in a practical commercial process a more concentrated slurry is desirable to prevent overloading the vacuum system with excess glycol. Preferably the slurry is a mixture of terephthalic acid and glycol in a mole ratio within the range 1:1 to 6:1.

The process of this invention is found to provide as much as a 50% increase in reaction rate as measured by increased throughput in continuous pollymerization systems. The advantages are obtained not only for the production of medium molecular weight polyesters conventionally found in textile grade yarns, i.e., those having an intrinsic viscosity of about 0.6, but more importantly the advantages are also obtained in the production of very high molecular weight polyesters useful as tire yarns, i.e., those with an intrinsic viscosity of about 0.8 to 0.95. Even when the glycol-terephthalic acid slurry is added in very small amounts which give only a minor increase in degree of polymerization, a marked improvement in polymer color is obtained.

It is surprising that the addition of such small amounts of terephthalic acid and glycol can cause the marked increase in degree of polymerization observed.

Although we do not wish to be bound by theory, it is assumed that added terephthalic acid reacts with hydroxyl ends to form water which has a higher vapor pressure than glycol, the normal product of polymerization. The presence of water in the system raises the total vapor pressure of liquid polymerizing mixture. Since this vapor pressure tends to be in equilibrium with the finisher operating pressure ad Dalton's and Henry's laws predict that any change in vapor pressure of the liquid mixture must be accompanied by corresponding changes in concentration of a volatile ingredients, it follows that the introduction of water with its higher vapor pressure must be accompanied by a decrease in concentration of volatile components in the liquid phase to maintain pressure equilibrium. Since the removal of volatile products of polymerization is considered to be the rate controlling step in the final polymerization of polyethylene terephthalate, this shift in concentration tends to displace the reaction equilibrium towards higher degrees of polymerization.

The term "relative viscosity" refers to the ratio of the viscosity of a 10% solution (2.15 gm. polymer in 20 ml. solvent) of polyethylene terephthalate in a mixture of ten parts of phenol and seven parts of 2,4,6-trichlorophenyl (by weight) to the viscosity of the phenoltrichlorophenyl mixture, per se, measured in the same units at 25° C.

The term "intrinsic viscosity" is defined as the limit of the fraction $$\frac{ln(r)}{c}$$

as $c$ approaches $o$, where $r$ is the relative viscosity and $c$ is the concentration in grams per 100 ml. of solution. The relative viscosity is the ratio of the viscosity of a solution of the polymer in a mixture of 10 parts of phenol and 7 parts of 2,4,6-trichlorophenol (by weight) to the viscosity of the phenol-trichlorophenol mixture, per se, measured in the same units at 25° C. Intrinsic viscosity is a measure of the degree of polymerization.

EXAMPLE I

This example illustrates the ease of attainment of higher polymer viscosities by the use of the present invention.

A continuous polymerization system is used for the production of polyethylene terephthalate of fiber-forming molecular weight. Dimethyl terephthalate and ethylene glycol are supplied continuously to an ester exchanger which is operated in the manner described by Vodonik in U.S. Patent No. 2,829,153, issued Apr. 1, 1958. Sufficient dimethyl terephthalate is supplied to produce approximately 95 lbs. (43.1 kg.) of polymer per hour. Catalysts introduced along with the glycol include 125 parts per million of manganese added as manganous acetate, 50 parts per million of sodium added as sodium acetate, and 510 parts per million of antimony added as antimony oxide. The product of the exchanger is primarily "monomer," i.e., bis-glycol terephthalate with a minor amount of low polymer. The molten monomer is transferred continuously to a second vessel which is maintained at a temperature of about 240° C. and a pressure of 70 mm. of mercury. A large amount of excess glycol is vaporized and removed in this vessel. The molten material is then transferred to a prepolymerizing vessel operated at a temperature of about 272° C. and 30 mm. mercury pressure, where low molecular weight polymer is produced. The product of the prepolymerizer, which has a relative viscosity of about 4.5 (a degree of polymerization of about 10), is passed on to a finisher where the temperature is raised to 277° C. and the pressure is reduced to 1.85 mm. of mercury. The final polymerization reaction is carried out in the finisher and the product removed is ready for spinning into yarn.

When the continuous polymerization system described above is operated with a glycol slurry of terephthalic acid (4 to 1 mole ratio), continuously added to the prepolymerizer product at the rate of 2.84 lbs. (1.29 kg.) per hour (about 1.20% based on polymer), the final polymer produced has a relative viscosity of 35.2. When no terephthalic acid slurry is added to the prepolymer, the final polymer viscosity is 27 RV. Thus the addition of terephthalic acid slurry is found to provide a 30% increase in polymer viscosity under the conditions described.

EXAMPLE II

The general continuous polymerization system of Example I is modified by the addition of an auxiliary finisher vessel ("post-finisher") to further raise the molecular weight of the final polymer product. The system is connected to a spinning machine and the polymer spun into yarn. Polymer throughput is established at 70 lbs./hr. (31.8 kg./hr.), using as catalyst 120 parts per million manganese, 340 parts per million antimony, and 50 parts per million sodium. After establishing the conditions necessary to produce a post-finisher product having a relative viscosity of 55 (experiment "a"), the conditions are changed by injecting into the prepolymerizer a glycol slurry of terephthalic acid (4:1 mole ratio), at a rate of 5.6 lbs./hr. (2.54 kg./hr.) in experiment "b," and at a rate of 6.5 lbs./hr. (2.95 kg./hr.) in experiment "c." The conditions obtained are summarized in the table below. It is noted in comparing experiment "b" with experiment "a" that the addition of terephthalic acid allows the production of a given molecular weight polymer at a considerably higher finisher pressure level. In experiment "c" it is seen that a higher molecular weight polymer may be obtained at an intermediate finisher pressure level.

TABLE 1.—POLYMERIZATION CONDITIONS

| | a | b | c |
|---|---|---|---|
| Terephthalic acid (TPA) added (approx. percent by weight of polymer) | 0 | 3.2 | 3.7 |
| Finisher Product, RV | 27 | 27 | 31.5 |
| Finisher temperature, °C | 277 | 277 | 277 |
| Finisher inventory (level): | | | |
| In | 3.0 | 2.5 | 2.0 |
| (Cm.) | (7.62) | (6.35) | (5.08) |
| Finisher pressure, mm. Hg | 2.08 | 3.0 | 2.4 |
| Post finisher product RV | 55 | 56 | 69 |
| Yarn RV | 52 | 54 | 60 |
| TPA/glycol rate: | | | |
| Lb./hr | 0 | 5.6 | 6.5 |
| (Kg./hr.) | (0) | (2.54) | (2.95) |

EXAMPLE III

This example illustrates that an excessive amount of terephthalic acid slurry inhibits polymerization.

The general continuous polymerization system of Example II is used to compare the effect of adding an excessive amount of terephthalic acid slurry with the effect obtained by an amount within the scope of the present invention.

(a) In one experiment a glycol slurry of terephthalic acid (6:1 mole ratio) is added to prepolymer of 3.6 to 4.0 RV at the rate of 8.75 lbs./hr. (3.98 kg./hr.) which is equivalent to 4% by weight terephthalic acid based on weight of polymer produced. (b) In a second experiment the glycol-terephthalic acid slurry is added to the same prepolymer at the rate of 11.6 lbs./hr. (5.26 kg./hr.), which is equivalent to 6% by weight of terephthalic acid based on weight of polymer produced. In experiment (b) it is found that even a considerably lower finisher pressure is incapable of producing a polymer viscosity as high as that obtained in experiment (a). The essential data are summarized in the table below.

TABLE 2

| | a | |
|---|---|---|
| TPA/glycol rate: | | |
| Lb./hr. | 8.75 | 11.6 |
| (Kg./hr.) | (3.98) | (5.26) |
| Percent TPA in polymer (by weight) | 4.0 | 6.0 |
| Finisher product, RV | 27.2 | 23 |
| Finisher pressure, mm. Hg | 3.8 | 1.9 |
| Finisher inventory level: | | |
| In | 2.0 | 2.3 |
| (Cm.) | (5.08) | (5.84) |

EXAMPLE IV

This example illustrates the improved color obtained by adding a small amount of a glycol slurry of terephthalic acid to a finisher.

A continuous polymerization system is adjusted to give a polymer product having a relative viscosity of 27–28 and the polymer is fed to a spinning machine which produces yarn. The conditions for producing this control yarn are recorded and the yarn color measured. Then a glycol slurry of terephthalic acid (3:1 mole ratio) is added to the inlet of the finisher vessel in sufficient quantity to give 0.75% TPA by weight based on weight of polymer. The resulting polymer is also spun into yarn and the color of the yarn measured. It is found that the test yarn, produced with the addition of terephthalic acid slurry to the finisher, is considerably less yellow than the control yarn.

Yellowness is measured by means of a differential colorimeter. The essential data of the experiment are recorded in the following table.

TABLE 3

| | Control | Test |
|---|---|---|
| Terephthalic acid added (percent by weight) | 0 | 0.75 |
| Finisher pressure, mm. Hg | 1.9 | 1.8 |
| Finisher temperature, °C | 289 | 286 |
| Inventory level: | | |
| In | 26 | 24 |
| (Cm.) | (66.0) | (61.0) |
| Yellowness factor ("b") | 2.1 | 0.8 |
| Polymer relative viscosity | 27–28 | 27–28 |

EXAMPLE V

The improvement obtained by adding a small amount of glycol slurry of terephthalic acid to a continuous polymerization system is not limited to those systems using manganese and antimony catalysts. This is illustrated in continuous polymerization experiments in which a catalyst mixture of lanthanum acetate and tetraisopropyltitanate is supplied in the feed glycol. In one experiment, it is found that the addition of a 40 weight percent slurry of terepthalic acid in glycol to the prepolymerizer vessel, in sufficient quantity to give 3.5% by weight of terephthalic acid in the final polymer, allows the finisher vessel to be operated at a temperature of 275° C. and 3.0 mm. Hg pressure for the production of polymer having a relative viscosity of 27. In a second experiment, using the same system without the addition of terephthalic acid slurry, it is necessary to operate the finisher vessel at a temperature of 285° C. and a pressure of 1.7 mm. Hg to give the same polymer viscosity.

EXAMPLE VI

Although a smooth, uniform addition of dry terephthalic acid powder to a polymerization system is more difficult than the addition of a glycol slurry, the improved results of the invention may be obtained in this manner also.

A continuous polymerization system, similar to that of Example I, is adjusted to give a throughput of 60 pounds (27.2 kg.) of polymer per hour. A mechanism for feeding powdered dry terephthalic acid is attached to the prepolymerizer and sufficient terephthalic acid is added to provide 2.75% by weight based upon the weight of polymer produced. A considerably higher finisher pressure can be used to produce a given polymer viscosity, than the pressure required when no terephthalic acid is added, as shown in the table below.

TABLE 4

| | Control | Test |
|---|---|---|
| Polymer throughput: | | |
| Lbs./hr. | 60 | 60 |
| (Kg./hr.) | (27.2) | (27.2) |
| Finisher product, RV | 24 | 24 |
| Finisher pressure, mm. Hg | 2.5 | 3.8 |
| Finisher inventory level: | | |
| In | 1.8 | 1.8 |
| (Cm.) | (4.57) | (4.57) |
| TPA, wt. percent of polymer | 0 | 2.75 |

EXAMPLE VII

A test run is made with the dry powder feeding mechanism of Example VI attached to the inlet of the finisher, instead of the prepolymerizer. In a control run, polymerization is carried out under the same conditions without addition of terephthalic acid to show the effect of added terephthalic acid on resulting polymer viscosity. An 8-unit increase in relative viscosity is obtained by adding 0.5% TPA, as shown in the following table.

TABLE 5

| | Control | Test |
|---|---|---|
| TPA added (weight percent based on polymer) | 0 | 0.50 |
| Finisher pressure, mm. Hg | 2.1 | 2.1 |
| Finsher inventory level: | | |
| In | 1.9–2.0 | 0.5 |
| (Cm.) | (4.83 5.08) | (1.27) |
| Relative viscosity (yarn) | 27.5 | 35.5 |
| Free carboxyls, eq./$10^6$ gms | 10 | 10 |

Since many different embodiments of the invention may be made without departing from the spirit and scope thereof, it is to be understood that the invention is not limited by the specific illustrations except to the extent defined in the following claims.

I claim:
1. In the production of polyethylene terephthalate by a continuous process of feeding dimethyl terephthalate and ethylene glycol components with catalyst to an ester interchange reactor and reacting the components to form bisglycol terephthalate monomer, feeding the monomer to a prepolymerizer and polymerizing the monomer to form low molecular weight prepolymer, feeding the prepolymer to a finish polymerizer and completing the polymerization to form fiber-forming polymer, and feeding the polymer to a spinning machine and melt-spinning the polymer into yarn; the improvement for increasing the degree of polymerization which comprises continuously adding to said prepolymer, having an intrinsic viscosity of 0.1 to 0.5, measured at 25° C. in a mixture of ten parts of phenol and seven parts of 2,4,6-trichlorophenyl (by weight), a glycol slurry of finely divided terephthalic acid sufficient to provide from 0.01% to 4% by weight of terephthalic acid based on the weight of polymer produced, the mole ratio of glycol: terephthalic acid in the slurry being within the range 1:1 to 6:1.

2. The process defined in claim 1 wherein the amount of terephthalic acid added to the prepolymer is less than $$Z_1 = e^{(1.93 - 0.151 RV)}$$

and is greater than $$Z_2 = e^{-(0.380 + 0.151 RV)}$$

where Z is the weight percent, based on polymer, of terephthalic acid added and RV is the relative viscosity of the prepolymer to which the terephthalic acid is added.

3. The process defined in claim 1 wherein the terephthalic acid is added to prepolymer which is then polymerized to an intrinsic viscosity of about 0.8 to 0.95.

References Cited

UNITED STATES PATENTS 3,245,955  4/1966  Rieber _____ 260—75

FOREIGN PATENTS 1,001,787  8/1965  Great Britain.
1,381,018  10/1964 France.
1,385,058  11/1964 France.
1,001,429  8/1965  Great Britain.

WILLIAM H. SHORT, Primary Examiner

M. GOLDSTEIN, Assistant Examiner